(12) United States Patent
Jeffryes

(10) Patent No.: US 10,612,989 B2
(45) Date of Patent: Apr. 7, 2020

(54) METHOD AND APPARATUS FOR AUTOMATED DRILLING RIG SHEAVE FRICTION CALIBRATION

(71) Applicant: Schlumberger Technology Corporation, Sugar Land, TX (US)

(72) Inventor: Benjamin Peter Jeffryes, Histon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 306 days.

(21) Appl. No.: 15/436,475

(22) Filed: Feb. 17, 2017

(65) Prior Publication Data

US 2018/0238162 A1 Aug. 23, 2018

(51) Int. Cl.
| | |
|---|---|
| G01L 5/04 | (2006.01) |
| E21B 19/08 | (2006.01) |
| G01L 25/00 | (2006.01) |
| E21B 44/02 | (2006.01) |
| E21B 47/00 | (2012.01) |

(52) U.S. Cl.
CPC ............... G01L 5/04 (2013.01); E21B 19/08 (2013.01); E21B 44/02 (2013.01); E21B 47/00 (2013.01); G01L 25/00 (2013.01)

(58) Field of Classification Search
CPC ............ E21B 44/00; E21B 19/08; G01L 5/04
See application file for complete search history.

(56) References Cited

U.S. PATENT DOCUMENTS 9,424,667 B2 8/2016 Pena et al.

FOREIGN PATENT DOCUMENTS

| GB | 2274778 A | 8/1994 |
| GB | 2275778 A | 9/1994 |

OTHER PUBLICATIONS

Cayeux et al., Accuracy and Correction of Hook Load Measurements During Drilling Operations, 2015, SPE/IADC Drilling Conference and Exhibition, https://doi.org/10.2118/173035-MS, pp. 1-38.*

* cited by examiner

*Primary Examiner* — Mischita L Henson
(74) *Attorney, Agent, or Firm* — Rachel E. Greene

(57) ABSTRACT

A method and autodriller for monitoring hookload in a well drilling system that measures raw hookload; determines a velocity of a travelling block; holds the travelling block in a non-lowering state for a first period of time; lowers the travelling block for a second period of time; calculates contribution to hookload of a component linear in the block velocity; calculates contribution to hookload of a component linear in a direction (sign) in the block velocity; and corrects measured raw hookload by the calculated contributions.

20 Claims, 9 Drawing Sheets

METHOD AND APPARATUS FOR AUTOMATED DRILLING RIG SHEAVE FRICTION CALIBRATION

TECHNICAL FIELD

The present disclosure relates generally to the field of drilling wells. More particularly, the invention relates to a method and apparatus for calibrating sheave friction.

BACKGROUND

The hookload, as measured from the deadline anchor tension, contains contributions not only from the weight of the drillstring, but also from friction in the sheaves. For example, GB 2 275 778 teaches a method for use during the drilling of a well with a drillstring suspended from a hook for determining the load on the hook (hookload), the hook being supported on a rig by a cable and a travelling block, the method comprising: measuring the tension in the cable, typically the deadline anchor tension, measuring a displacement of the travelling block, and the velocity of the travelling block during displacement so as to estimate the friction and using the estimate of friction and the measured cable tension to determine the load on the hook. The arrangement uses a deadline tension sensor, a crown block encoder to measure displacement of the travelling block, and also (since the rig is a floating rig) a slip joint encoder to measure riser extension and a sensor of displacement of the motion compensator. In GB 2 275 778 methods are taught for correcting for some of these frictional effects. The methods differed between rigs with a passive motion compensator (floating rigs in general) and those without.

SUMMARY

In accordance with the teachings of the present disclosure, disadvantages and problems associated with existing systems and methods for measuring hookload. The current invention accounts both for linear friction effects, and friction that depends only on the direction of motion—not its amplitude (Coulomb friction). Also, the technique may be applied equally well to rigs with and without a motion compensator.

An aspect of the invention provides a method for monitoring hookload in a well drilling system, the method comprising: measuring raw hookload; determining a velocity of a travelling block; holding the travelling block in a non-lowering state for a first period of time; lowering the travelling block for a second period of time; calculating contribution to hookload of a component linear in the block velocity; calculating contribution to hookload of a component linear in a direction in the block velocity; and correcting measured raw hookload by the calculated contributions.

According to another aspect of the invention, there is provided an autodriller for monitoring hookload in a well drilling system, the autodriller comprising: a hookload receptor that receives a signal corresponding to raw hookload; a travelling block receptor that receives a signal corresponding to travelling block velocity; a processor; a non-transitory storage medium; and a set of computer readable instructions stored in the non-transitory storage medium, wherein when the instructions are executed by the processor allow the autodriller to: command the travelling block to not lower for a first period of time; command the travelling block to lower for a second period of time; calculate contribution to hookload of a component linear in the block velocity; calculate contribution to hookload of a component linear in a direction in the block velocity; and correct measured raw hookload by the calculated contributions.

BRIEF DESCRIPTION OF THE DRAWINGS

A more complete understanding of the present embodiments may be acquired by referring to the following description taken in conjunction with the accompanying drawings, in which like reference numbers indicate like features.

DETAILED DESCRIPTION

Preferred embodiments are best understood by reference to FIGS. 1-12 below in view of the following general discussion. The present disclosure may be more easily understood in the context of a high level description of certain embodiments.

Figure 1:
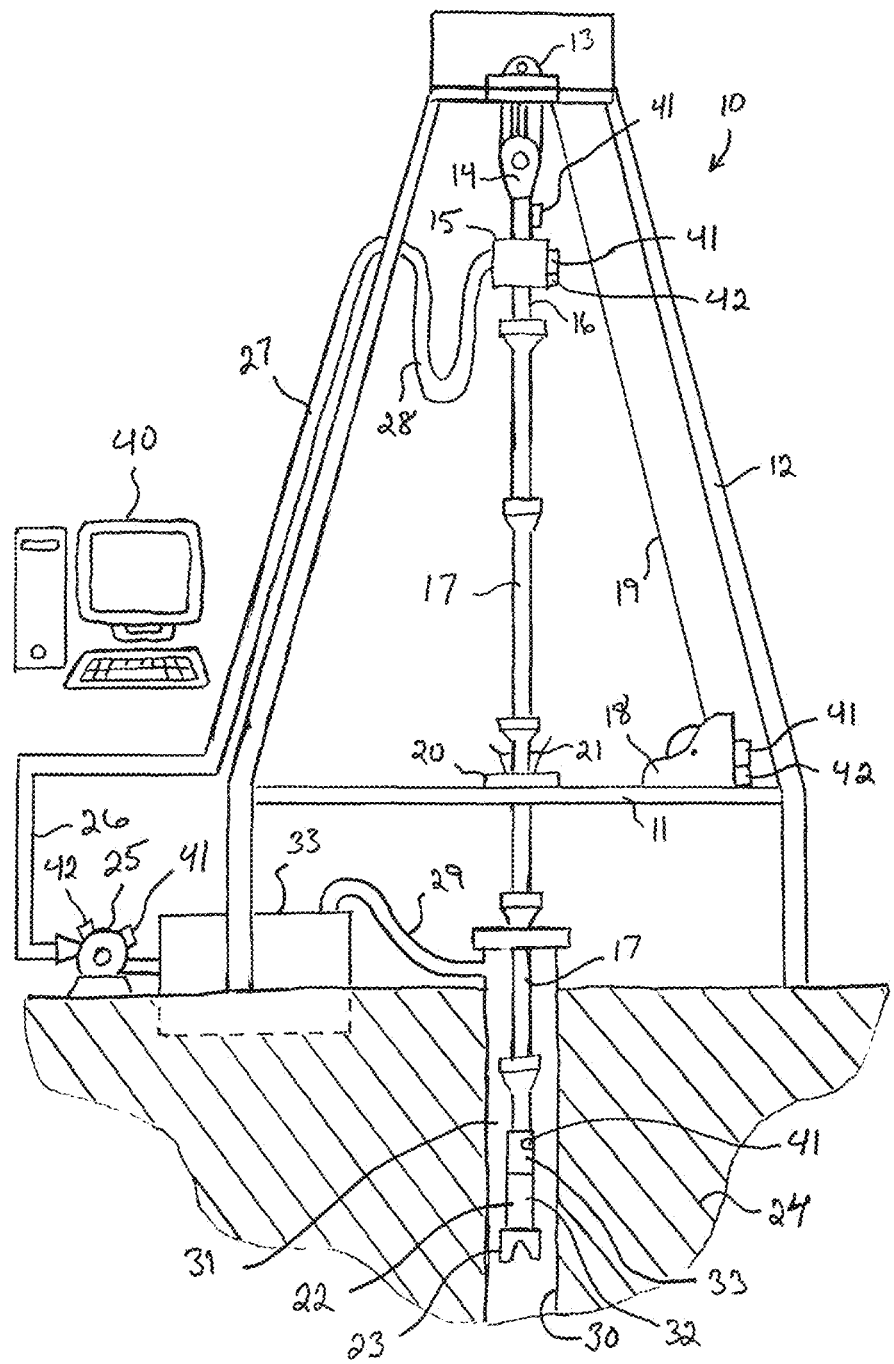
FIG. 1 illustrates a schematic diagram of a drill rig being operated to conduct a drilling operation controlled by an autodriller.

FIG. 1 is a basic diagram of a drill rig 10 in the process of drilling a well. The drilling rig 10 comprises a drilling rig floor 11 that is elevated and a derrick 12 that extends upwardly from the floor. A crown block 13 is positioned at the top of the derrick 12 and a traveling block 14 is suspended therefrom. The traveling block 14 may support a top drive 15. A quill 16 extends from the bottom side of the top drive 15 and is used to suspend and/or turn tubular drilling equipment as it is raised/lowered in the wellbore 30. A drill string 17 is made up to the quill 16, wherein the drill string 17 comprises a total length of connected drill pipe stands, or the like, extending into the well bore 30. One or more motors housed in the top drive 15 rotate the drill string 17. A drawworks 18 pays out and reels in drilling line 19 relative to the crown block 13 and traveling block 14 so as to hoist/lower various drilling equipment.

As shown in FIG. 1, a new stand of drill string 17 has been made up as the lower portion of the drill string 17 is suspended from the rig floor 11 by a rotary table 20. Slips 21 secure the suspended portion of the drill string 17 in the rotary table 20. A bottom hole assembly 22 is fixed to the lower end of the drill string 17 and includes: a drill bit 23 for drilling through a formation 24; a positive displacement motor (PDM) 32; and a measurement while drilling (MWD) module 33.

During the drilling process, drilling mud may be circulated through the wellbore 30 to remove cuttings from around the drill bit 23. A mud pump 25 pumps the drilling mud through a discharge line 26, stand pipe 27, and rotary hose 28 to supply drilling mud to the top drive 15. Drilling mud flows from the top drive 15 down through the drill string 17, where it exits the drill string 17 through the drill bit 23. From the drill bit 23, the drilling mud flows up through an annulus 31 existing between the wellbore 30 and the drill string 17 so as to carry cuttings away from the drill bit 23. A return line 29 allows the drilling mud to flow from the top of the annulus 31 into a mud pit 33. Of course, the mud pump 25 is supplied drilling mud from the mud pit 33. The drilling mud typically passes through a series of shakers, separators, etc. (not shown) to separate the cuttings from the drilling mud before the mud is circulated again by the mud pump 25.

Referring again to FIG. 1, an autodriller 40 may be used to control the drilling process. The autodriller 40 may be configured to receive drilling parameter data and drilling performance data related to operations of the drilling rig 10. The drilling parameter data and drilling performance data may comprise measurements monitored by a number of sensors 41 placed about the drilling rig 10, e.g., on the drawworks 18, the traveling block 14, the top drive 15, the mud pump 25, and the measurement while drilling (MWD) module 33 as shown in the illustrated embodiment. The sensors 41 may monitor current, voltage, resistivity, force, position, weight, strain, speed, rotational speed, or any other measurement related to drilling parameters or drilling performance, and relevant input may be aggregated as raw sensor measurements or as scaled engineering values. The autodriller 40 may receive drilling parameter data and drilling performance data directly from the sensors 41, retrofitted to certain pieces of equipment on the drilling rig 10, such that the sensors 41 effectively form part of the drilling system. This type of data acquisition may allow for higher sampling rates to be used for monitoring relevant drilling parameters and drilling performance metrics. One of the sensors 41 may measure raw hookload and another sensor 41 may provide data that allows for a determination of the travelling block velocity.

Several components of the drill rig 10 may also comprise control actuators 42. For example, the drawworks 18 may comprise an actuator 42 that allows the autodriller 40 to control the workings of the drawworks 18. The top drive 15 and mud pump 25 may also have actuators 42. The actuators 42 allow the autodriller 40 to control various aspects of the drilling process, for example: bit rotation speed, drill string rotation direction, weight on bit, drilling mud fluid pressure, drilling mud fluid flow rate, drilling mud density, etc.

Figure 2:
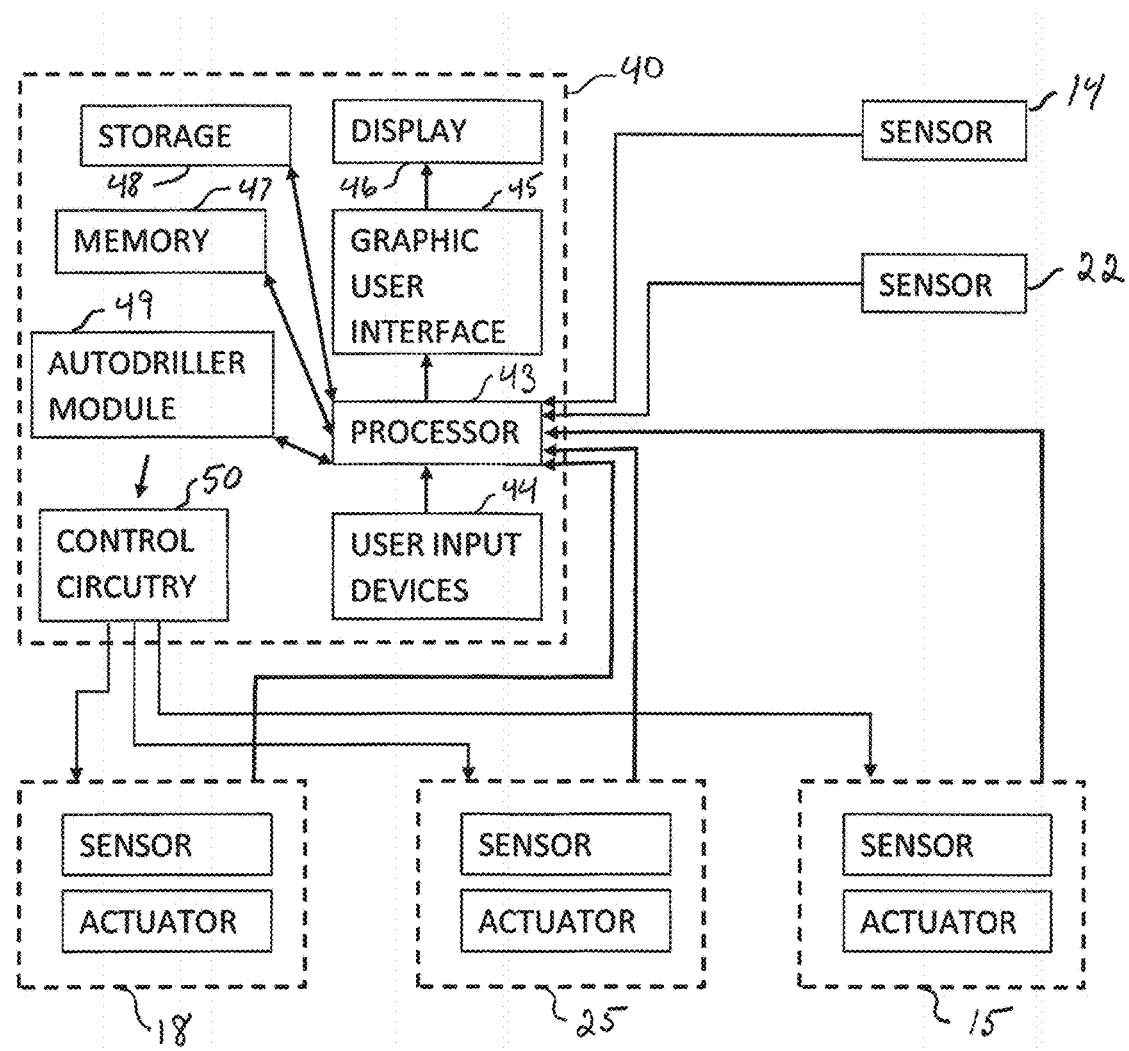
FIG. 2 shows a schematic diagram of an autodriller illustrating various components communicating with each other and with sensors and actuators of the drilling system.

Referring to FIG. 2, a schematic of an autodriller 40 and other drilling rig components is illustrated. The autodriller 40 may comprise a processor 43 that may receive various inputs, such as the drilling parameter data and drilling performance data, from sensors 41. In addition, the processor 43 may be operably coupled to a memory 47 and a storage 48 to execute computer executable instructions for carrying out the presently disclosed techniques. These instructions may be encoded in software/hardware programs and modules that may be executed by the processor 43. The computer codes may be stored in any suitable article of manufacture that includes at least one tangible non-transitory, computer-readable medium (e.g., a hard drive) that at least collectively stores these instructions or routines, such as the memory 47 or the storage 48. An autodriller module 49 may comprise hardware/software for providing autodriller control.

In some embodiments, the autodriller control algorithms may be located in the autodriller module 49. In other embodiments, the autodriller control algorithms may be located on programmable logic controllers (PLCs) that control the drilling rig actuators themselves. In some embodiments, the autodriller control algorithms may be implemented in a software layer above the PLC layer. For example, the autodriller control algorithm would compute the commanded ROP to send to the fast-acting P-I controller on drawworks speed.

Figure 3:
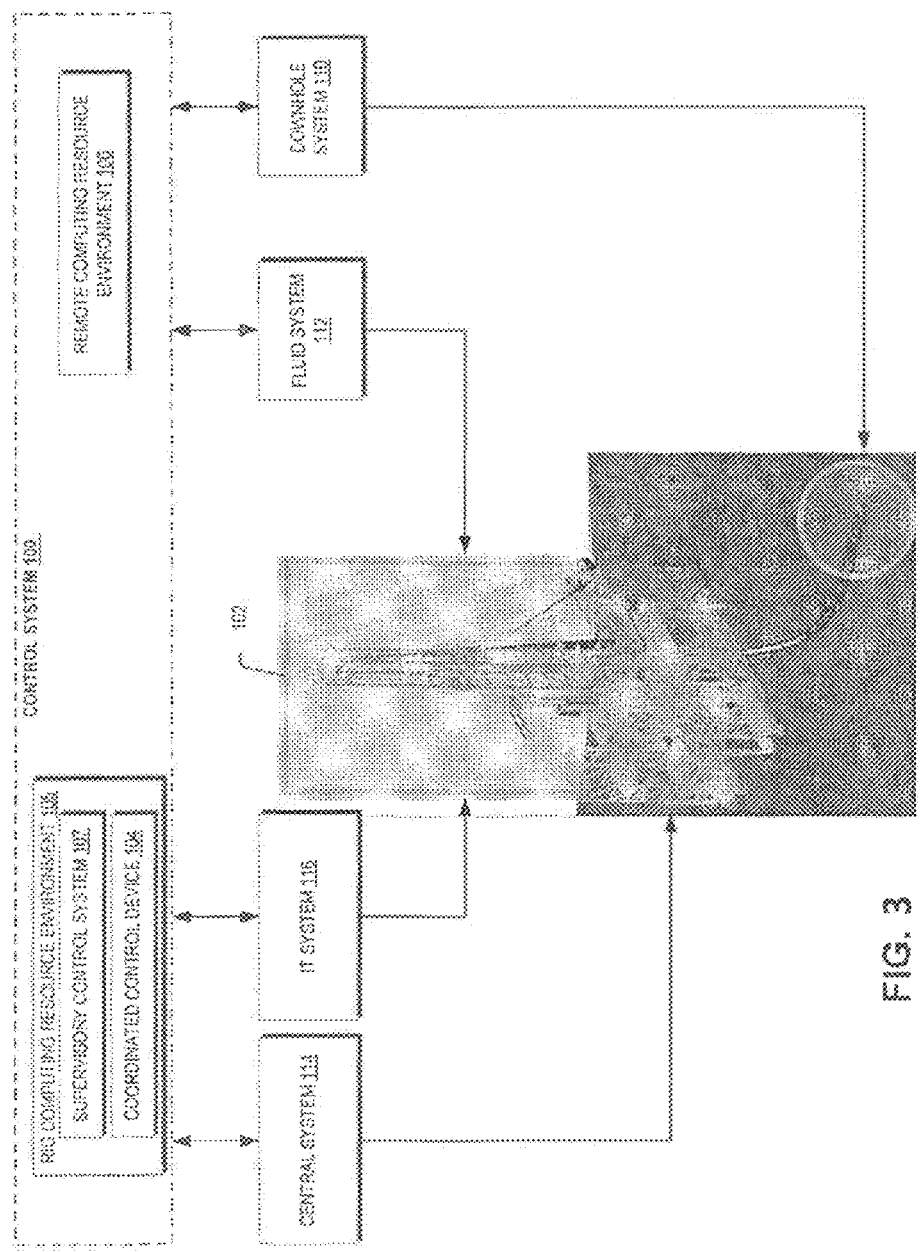
FIG. 3 illustrates a schematic view of a drilling rig and a control system.

The method and system of the present invention to move the travelling block to calibrate hookload may be used with a rig control system as disclosed in US Publication No. 2016/0290046, incorporated herein by reference in its entirety. FIG. 3 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection).

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 3. For example, the drilling rig 102 may include a downhole system 110, a fluid system 112, and a central system 114. In some embodiments, the drilling rig 102 may include an information technology (IT) system 116. The downhole system 110 may include, for example, a bottomhole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment.

Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, etc.). An embodiment of the control system 100 that is unified, may, however, provide control over the drilling rig 102 and its related systems (e.g., the downhole system 110, fluid system 112, and/or central system 114).

Figure 4:
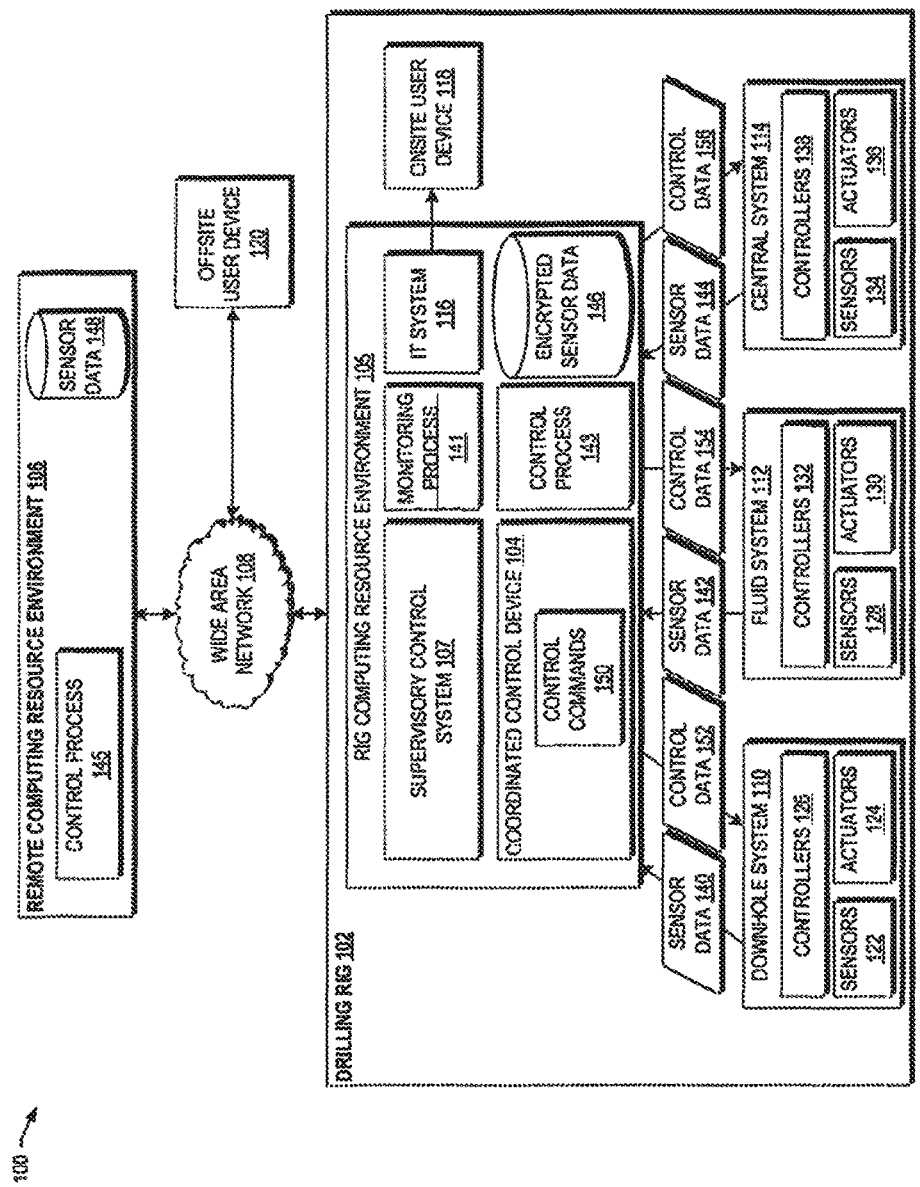
FIG. 4 illustrates a schematic view of a drilling rig and a remote computing resource environment.

FIG. 4 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 4 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The systems of the drilling rig 102 may include various sensors, actuators, and controllers (e.g., programmable logic controllers (PLCs)). For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data at the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. The variation in measurements at different locations over time may be used to determine equipment performance, system performance, scheduled maintenance due dates, and the like. For example, slip status (e.g., in or out) may be acquired from the sensors and provided to the rig computing resource environment 105. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands.

In some embodiments, control of the various systems of the drilling rig 102 may be provided via a three-tier control system that includes a first tier of the controllers 126, 132, and 138, a second tier of the coordinated control device 104, and a third tier of the supervisory control system 107. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The encrypted sensor data 146 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a thin client configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. A user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration.

In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Figure 5:
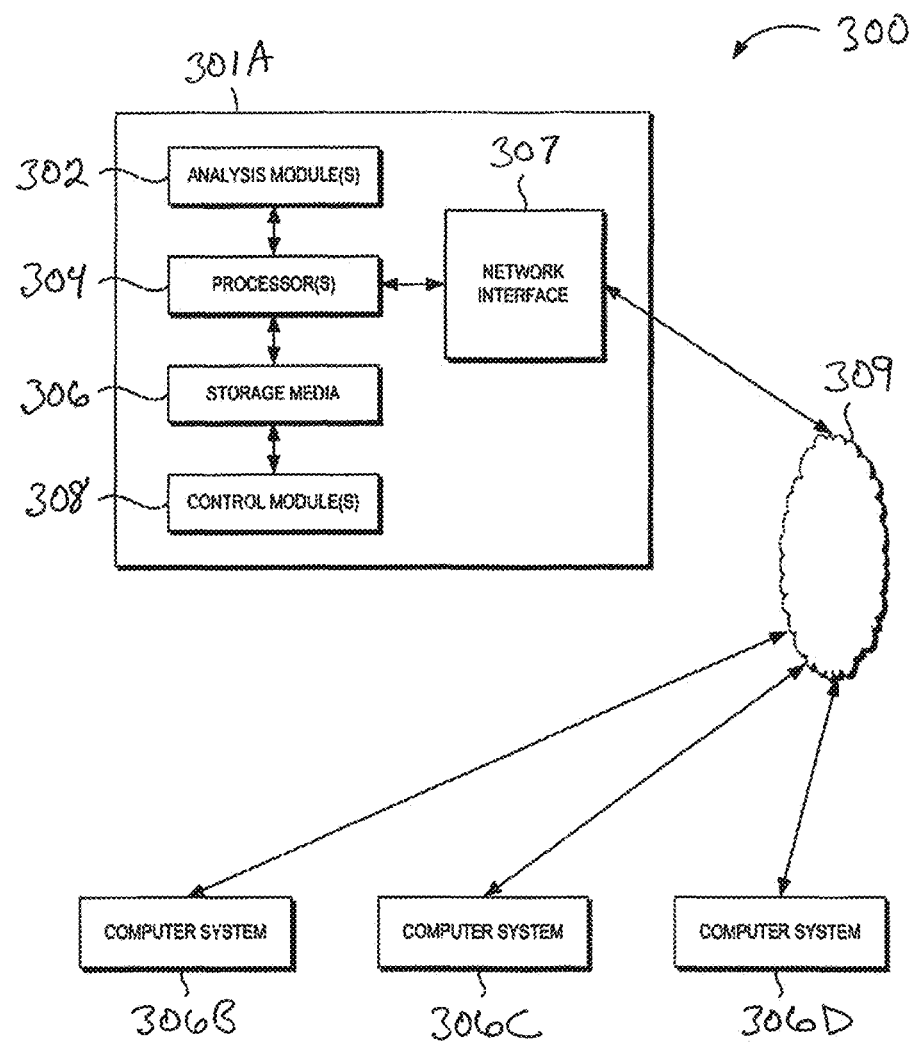
FIG. 5 illustrates a schematic view of a computing system.

In some embodiments, the methods of the present disclosure may be executed by a computing system. FIG. 5 illustrates an example of such a computing system 300, in accordance with some embodiments. The computing system 300 may include a computer or computer system 301A, which may be an individual computer system 301A or an arrangement of distributed computer systems. The computer system 301A includes one or more analysis modules 302 that are configured to perform various tasks according to some embodiments, such as one or more methods disclosed herein. To perform these various tasks, the analysis module 302 executes independently, or in coordination with, one or more processors 304, which is (or are) connected to one or more storage media 306. The processor(s) 304 is (or are) also connected to a network interface 307 to allow the computer system 301A to communicate over a data network 309 with one or more additional computer systems and/or computing systems, such as 301B, 301C, and/or 301D (note that computer systems 301B, 301C and/or 301D may or may not share the same architecture as computer system 301A, and may be located in different physical locations, e.g., computer systems 301A and 301B may be located in a processing facility, while in communication with one or more computer systems such as 301C and/or 301D that are located in one or more data centers, and/or located in varying countries on different continents).

A processor may include a microprocessor, microcontroller, processor module or subsystem, programmable integrated circuit, programmable gate array, or another control or computing device.

The storage media 306 may be implemented as one or more computer-readable or machine-readable storage media. Note that while in the example embodiment of FIG. 5 storage media 306 is depicted as within computer system 301A, in some embodiments, storage media 306 may be distributed within and/or across multiple internal and/or external enclosures of computing system 301A and/or additional computing systems. Storage media 306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 300 contains one or more rig control module(s) 308. In the example of computing system 300, computer system 301A includes the rig control module 308. In some embodiments, a single rig control module may be used to perform some or all aspects of one or more embodiments of the methods disclosed herein. In alternate embodiments, a plurality of rig control modules may be used to perform some or all aspects of methods herein.

It should be appreciated that computing system 300 is only one example of a computing system, and that computing system 300 may have more or fewer components than shown, may combine additional components not depicted in the example embodiment of FIG. 5, and/or computing system 300 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

As shown in FIG. 2, the autodriller 40 may also comprise a display 46 coupled with the processor 43 to visibly display a Graphic User Interface 45. The Graphic User Interface 45 may show to the drill rig operator the drilling parameter data, drilling performance data, and calculated values in real time. Other values derived from the drilling parameter data and drilling performance data may also be displayed. Audible indication devices may output an alarm or other audible indication to alert the drilling operator of the outset of a drilling issue and an appropriate parameter adjustment for mitigating the issue. The autodriller 40 may be equipped with control circuitry 50 to control certain drilling parameters of the drilling rig 10, such that an adjustment determined by the autodriller module 49 may be automatically implemented in the appropriate drilling equipment. For example, if the autodriller module 49 determines that the flow rate of the drilling mud should be increased, the control circuitry 50 may automatically signal the pump 25 to increase the flow rate.

The Graphic User Interface 45 may showing traces related to certain drilling parameter data and performance data that may be used to identify and mitigate drilling issues (e.g., bit-balling, stick/slip vibrations, etc.) in accordance with present techniques. The Graphic User Interface 45 may show traces for drilling parameter values that may be aggregated in real-time or with an inherent delay during drilling operations. In addition to numerical readouts, the Graphic User Interface 45 may show traces of drilling parameter values monitored by the sensors 41, including traveling block height, wellbore depth, drill bit depth (aligned with the well depth), torque of a drilling feature (e.g., the drill bit 23), weight on bit WOB, hook-load, rotational speed (RPM) of a drilling feature (e.g., the drill bit 23), flow rate of drilling mud, stand pipe pressure (SPP), and hydraulic horsepower per square inch (HIS) of drilling mud. Other drilling parameter values may be received from the sensors 41 or interpreted from sensor data, and some drilling parameter values may be related to others or monitored using the same sensors (e.g., WOB and hook-load). In some embodiments, different illustrative techniques may be employed for data representation.

A drilling performance value may be received by the system and traced on the Graphic User Interface 45 with respect to time. The drilling performance value is a value indicative of drilling progression, e.g., rate of penetration (ROP) of the drill string 17 progressing downward into the wellbore 30. In some embodiments, the drilling performance value may be a monitored or calculated drilling efficiency metric. As previously noted, drilling performance values such as the ROP may be affected by the drilling parameter values throughout drilling operation. For example, increasing the WOB provides a greater amount of force to the drill bit 23 for cutting into the formation 24, thereby increasing the ROP. The drilling parameters may affect the ROP in different ways depending on the equipment used on the particular drilling rig 10, the sharpness or dullness of the drill bit 23, and certain lithological features of the formation 24, as will be apparent to one skilled in the art. For example, a combination of drilling parameters that may produce a satisfactory level of the ROP in one formation may produce less desirable performance results in another formation.

The autodriller 40 controls the vertical movement of the drill string so as to keep a drilling parameter at a set value, i.e., weight, or surface rate-of-penetration (ROP), or pressure. The autodriller 40 uses some form of a proportional-integral (PI) controller, which has two parameters in addition to the constant parameter—the proportional and the integral gains. The transient behavior of the drilling system as the set value is changed, depends both on these parameters and parameters that describe the dynamics of the drilling process. The autodriller 40 of the present invention combines data acquired during both transients and when at set values to estimate drilling process parameters and to optimize the PI controller parameters.

One aspect of the invention is essentially a calibration method for estimating the frictional contribution to the deadline anchor tension. After the calibration period, two parameters are set by the system—one for linear velocity dependent friction and one for Coulomb friction. During this period the driller (or autodriller 40) must drill in a pattern comprising periods when the travelling block is held stationary (or moves up) and periods when it is allowed to descend. After the calibration period is over, the parameters are used to correct the hookload and remain unchanged. If necessary, the calibration may be repeated. Recalibration may be done at any time—or it may be prompted by an automatic system that detects when the parameters are not providing hookload correction.

Measured deadline anchor tension data indicates that the data contains three contributions.

$$H_T = H + Lv + C\frac{v}{|v|} \qquad (1)$$

where $H_T$ is the deadline anchor tension, H is the true hookload and v is the velocity of the travelling block (if there is a motion compensator it is assumed to be below the travelling block in this analysis). The coefficients L and C are unknown before calibration. The term Lv is from linear friction. The $$C\frac{v}{|v|}$$

term is from Coulomb friction. From henceforth we substitute $$c = \frac{v}{|v|}$$

During steady drilling, there are two complicating factors in evaluating the coefficients L and C. Firstly, v and c are highly correlated. Indeed, if v is constant then they are the same (up to proportionality). That means that it is difficult to use estimation techniques on data in order to evaluate L and C without additional information—and the coefficients evaluated by these techniques will be unreliable. Some correlation between v and c is inevitable—but it can be kept to a minimum.

The other complication is that the true hookload H may also contain a velocity dependent component. In general, the velocity of the drill bit (the rate of penetration) depends on the weight-on-bit, which is given by the drillstring weight minus the hookload. If the bit velocity is highly correlated with the travelling block velocity then evaluating L and C from this equation can result in a contribution to these coefficients from the effects of rock drillability.

Figure 6:
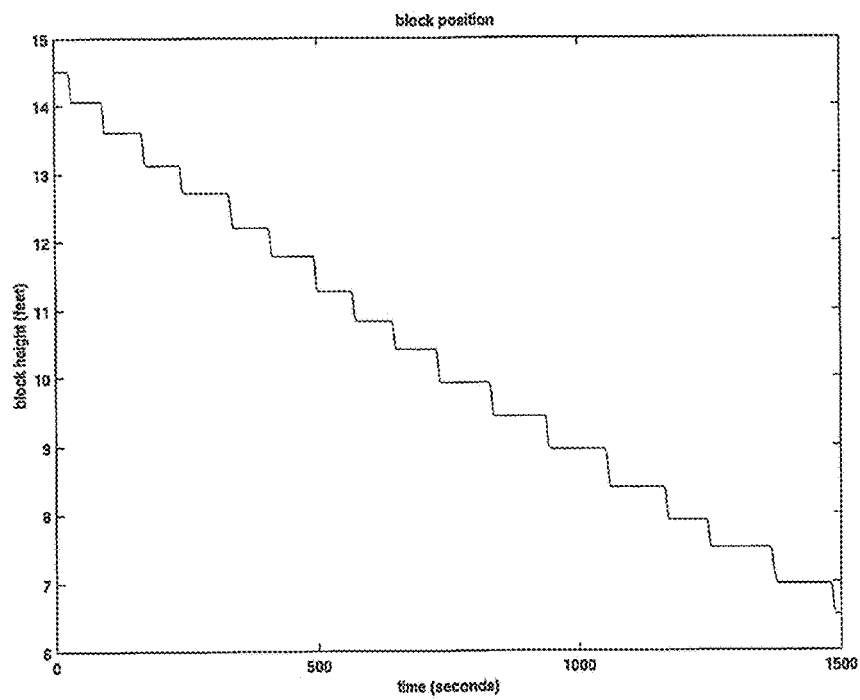
FIG. 6 shows travelling block movement during a calibration period (block height against time).

FIG. 6 shows the block movement during a calibration period. The block is being moved down in steps. As shown in the illustration, the block is moved down around 6 inches for each movement and it is held steady for periods of time between the movements. In an alternative embodiment, the travelling block may be moved down for each movement and moved upward for periods of time between the downward movements. In still another embodiment, the travelling block may be moved down for each movement and held steady and/or moved upward for periods of time between the downward movements.

Figure 7:
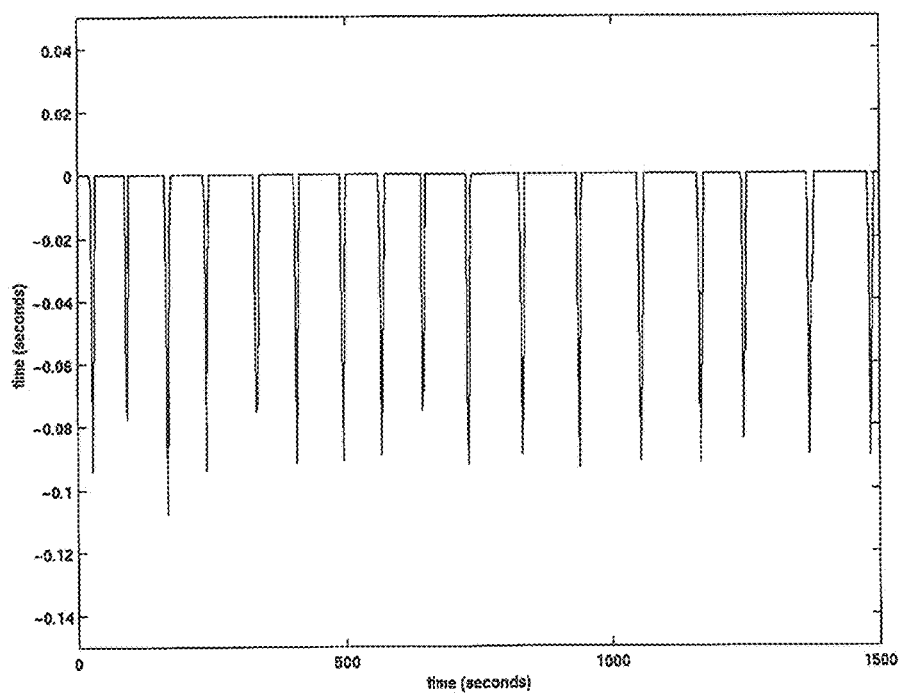
FIG. 7 shows travelling block velocity during the same calibration period shown in FIG. 6.

FIG. 7 shows the block velocity over the same period as shown in FIG. 6.

Figure 8:
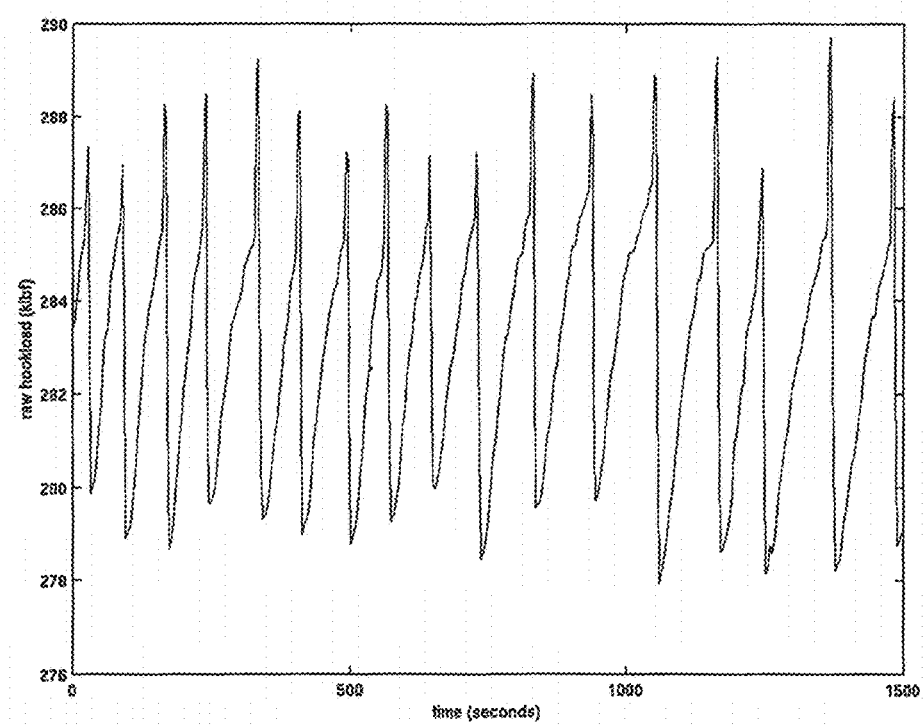
FIG. 8 shows the raw hookload during the same calibration period shown in FIG. 6.
Figure 9:
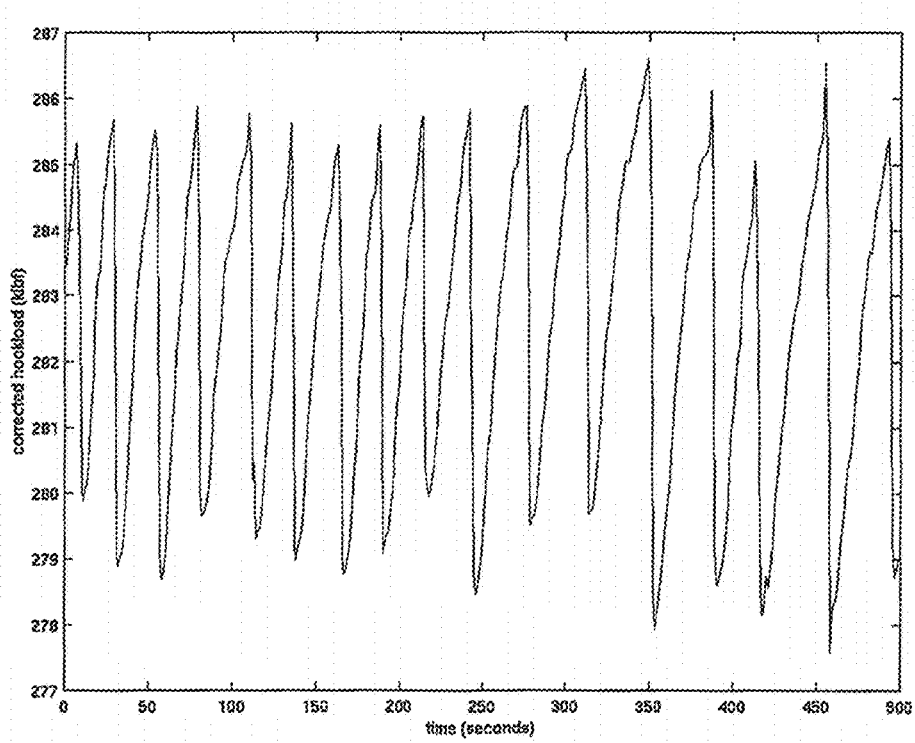
FIG. 9 shows real time corrected hookload during the same calibration period shown in FIG. 6.

FIG. 8 shows the hookload over the same period as shown in FIGS. 6 and 7. The hookload shows prominent spikes each time the block moves. The spiked increases in hookload are understood to be due to friction, because block movement downward should reduce the hookload (as more weight is taken up by the bit) not increase it. Equation (1) may be rewritten as $$H = H_T - Lv - Cc \qquad (2)$$

and linear regression may be used to find the values of L and C that minimize the mean squared value of H over the calibration time interval. Over this calibration period a linear regression yields L=−10 klbf s/foot
C=−2 klbf Equation 2 can then be used to back-calculate H over the calibration interval, and this is shown in FIG. 9. The "spikes" shown in FIG. 9 are almost entirely corrected as compared to the spikes shown in FIG. 8. Some remnants of the spikes remain in FIG. 9, indicating that the method does not provide complete correction.

Figure 10:
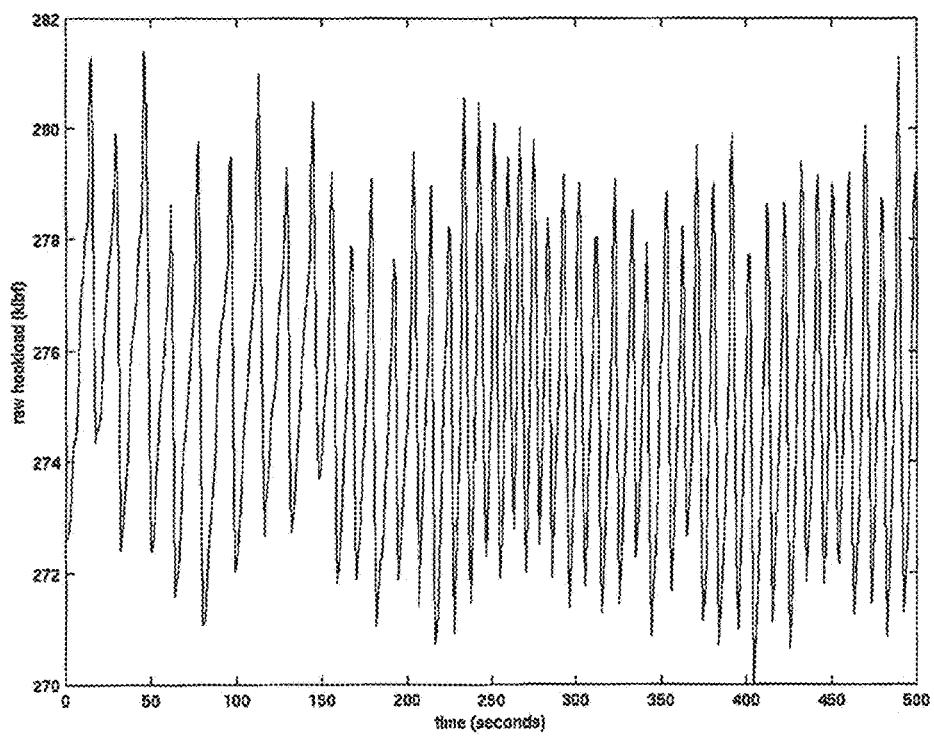
FIG. 10 shows the raw hookload taken from another period on the same well a day after the calibration period shown in FIG. 6.
Figure 11:
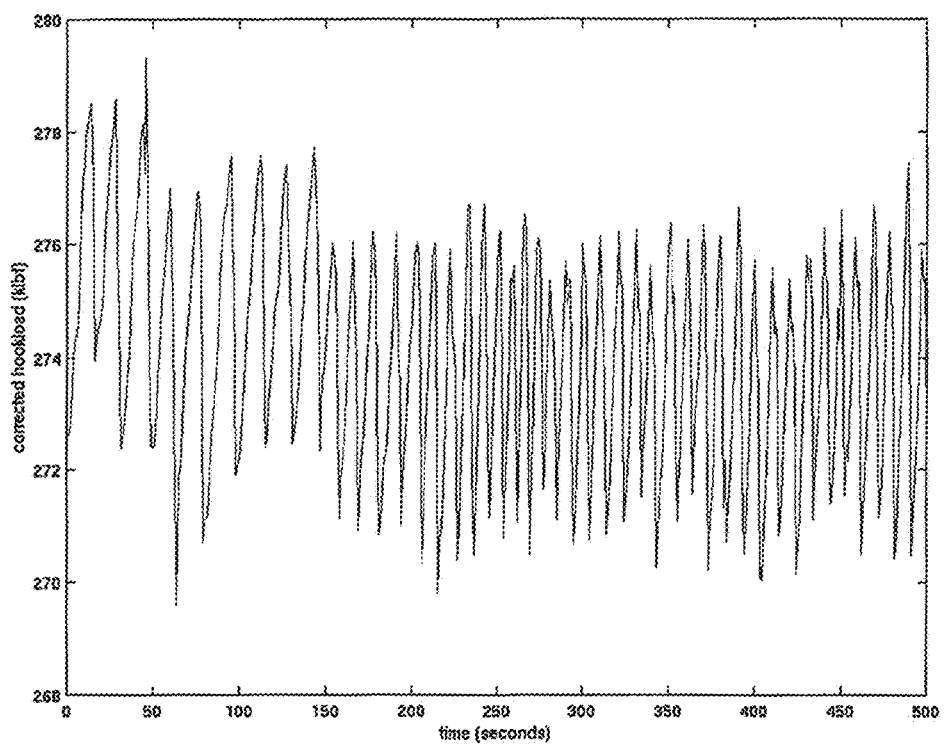
FIG. 11 shows corrected hookload for the raw hookload shown in FIG. 10.

Once the calibration period is over, the same friction parameters can then be used in real-time to calculate a corrected hookload. For example, FIG. 10 shows the uncorrected hookload from another period on the same well as had been used to collect the hookload data shown in FIG. 8, but the hookload data of FIG. 10 was taken a day later than the hookload data of FIG. 8. FIG. 11 shows the corrected hookload for the hookload data of FIG. 10, wherein the FIG. 11 data is corrected using the values of L and C obtained during the calibration period. Using a parameter estimated from the data during the time interval in FIG. 10 would have resulted in a slightly different set of friction parameters. However, using the calibrated values of L and C results in 95% of the reduction in hookload variance of the optimum parameters.

During normal operations the calibration procedure might be carried out regularly, for instance once a day. Alternatively, the reduction in variance of the hookload obtained with the calibrated value could be continuously compared with variance reduction using the optimal parameters obtained from the most recent section of data drilled. An alarm would be raised when the ratio dropped below a threshold (for instance 80%), and the driller could then choose a time for recalibration.

The weight on bit derived from the calibrated hookload may be used for further control operations of the drilling rig, such as optimization of the rate of penetration, in which a model is calibrated using surface weight on bit, torque and block-movement data. For example, U.S. Pat. No. 9,424,667, incorporated in its entirety herein by reference, teaches that energy values may be correlated with drilling parameters to assess drilling efficiency. The calibration may involve a step in which surface weight on bit data is combined with surface rate-of-penetration data to obtain an estimate of downhole rate-of-penetration. The fit of the data to the model is expected to be better using the calibrated hookload compared to the uncalibrated hookload. By making model estimations using both calibrated and uncalibrated data and comparing the two, comparing the goodness of fit to the models for the two models may be used to determine when to re-calibrate the model.

If downhole weight-on-bit data is available from the MWD apparatus 23 or other tools in the BHA, then the calibrated weight-on-bit should show a better match to the downhole data than the uncalibrated data—as there will be a systematic shift in the uncalibrated surface weight due to the downward motion of the block. Again, monitoring this improvement can be used to assess the effectiveness of the calibration and determine if re-calibration may be necessary.

The method described with reference to FIGS. 6-11 is for calibrating the dependence of the measured hookload on the motion of the travelling block 14. This measurement is noise on the true hookload measurement, and thus its removal may result in a more accurate measurement of hookload and hence weight-on-bit. The calibration method uses a model where the sheave friction is the sum of two terms, one is proportional to the block velocity and the other is proportional to the sign of the block velocity. According to the method described with reference to FIGS. 6-11, the calibration method requires the travelling block 14 to move in a succession of steps, wherein the travelling block 14 is held steady between movements.

According to a further aspect of the invention, this calibration method may be used in combination with an automated procedure for moving the travelling block 14, in order to effect the calibration.

Calibration may be initiated by the action of the driller (for instance pressing a button, clicking on a screen virtual button on the Graphic User Interface 45 (see FIG. 2)), or the autodriller 40 may request that calibration is required, to be confirmed by the driller or another member of the rig crew. Calibration may take place automatically as directed by autodriller 40 during the course of drilling, for instance either at a set time, or length of drilling, or when indications are that a previous calibration is inaccurate. For instance, in the absence of friction, when the block moves down, the hookload typically increases. However, with friction, there is an initial increase in hookload (a spike) when the travelling block 14 starts moving. After correction, this increase disappears or is reduced in amplitude. But, if the calibration is becoming inaccurate, the spike will grow, rather than reduce in amplitude.

In general, the block motion during the procedure is for the travelling block 14 to be maintained in a steady position for a number of seconds, then to be lowered over a short time (normally a couple of seconds) and then held steady again. This block motion is repeated, and using linear regression or other means, the contribution to the hookload of a component linear in the block velocity and another component linear in the direction of the block velocity is calculated. This requires a hookload measurement, and a measurement of the block velocity, or displacement (from which velocity may be calculated). Ideally, the block velocity should not follow the same time-profile each time the block is moved.

When the calibration takes place the weight-on-bit will increase when the travelling block 14 is lowered, and then decrease when the travelling block 14 is held steady (the drill-off). It may be important that the weight-on-bit does not exceed maximum and minimum values during this procedure, thus these should be set beforehand, and the during the calibration the travelling block 14 moves within these limits. Preferably, there should be a mixture of full amplitude fast and slow block movements, together with some shorter movements, to provide a range of velocity profiles during calibration.

An example, and initial calibration procedure may be for a minimum number of block movements (for instance four), then the friction coefficients to be calculated from this data, and a further number of block movements made with different velocity profiles (for instance two), and the friction coefficients based on the initial block movements used to estimate the friction contribution to the subsequent movements. If this results in a reduction in variation in hookload after correction which is comparable to that obtained on the data from which the friction coefficient was calculated, then all the data is used to obtain a best estimate of the friction coefficient, and the procedure may be terminated. If there is insufficient reduction in variation after correction, then further movements are made, each time calculating the friction coefficients from all the previous data and using it to estimate the friction on the new data. Once the procedure has converged, either because the estimated friction coefficients are little changed at each step, or little difference is observed between the reduction in variation on past and new data, then normal drilling is resumed. The procedure may also terminate for other reasons, such as a maximum number of drill-offs, or because other events intervene (for instance, then end of a stand, or a drilling break for other reasons).

During the course of normal drilling, drill-offs may also be made, and these can be used to iteratively adjust the friction parameters.

Once calibrated, for subsequent calibrations, the existing friction coefficients may be used to estimate the sheave friction contribution during the first block movements, and if the estimation is sufficiently good (in the sense described in the previous paragraph), then the calibration terminated at this point, using the new data to update or replace the friction coefficient.

Drill-offs are useful for calibration of other model-based systems, and thus these sheave friction calibrations may also provide such useful data, and it may prove useful for these other calibrations (for instance of rate-of-penetration versus weight-on-bit or rotation speed) to vary other parameters (for instance rotation-speed).

Figure 12:
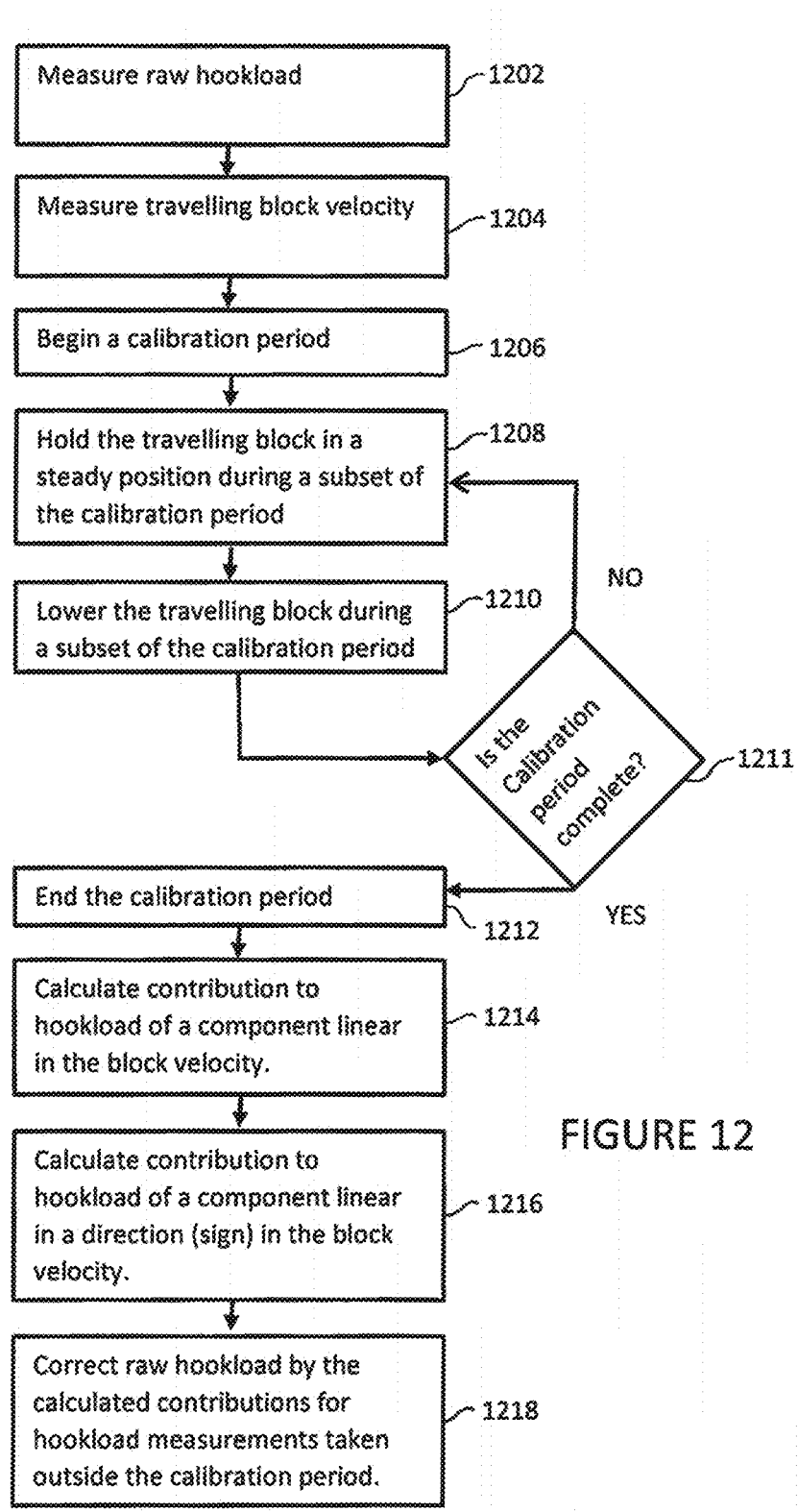
FIG. 12 illustrates a flow chart of an algorithm for correcting raw hookload.

FIG. 12 illustrates a flow chart of an algorithm embodiment of the invention. The raw hookload is measured 1202 and the travelling block velocity is measured 1204. A calibration period is begun 1206. As illustrated in FIGS. 6 and 7, the calibration period was 25 minutes (1500 seconds). However, the calibration period may be as short as 5 minutes or as long as 45 minutes. In certain environments and applications even shorter or longer calibrations periods may be used. During a subset of the calibration period, the travelling block 14 (see FIG. 1) is held 1208 in a steady position. The subset of the calibration period for holding steady may last 1-120 seconds, or 40-100 seconds, or 60-80 seconds. During a subset of the calibration period, the travelling block 14 is then lowered 1210 during a drilling operation. The subset of the calibration period for lowering may last 1-20 second, or 2-10 seconds, or 3-5 seconds. A decision 1211 is made whether the calibration period is complete. If it is not complete, the algorithm returns to the holding step 1208 so that holding 1208 and lowering 1210 are repeated. If the calibration period is complete, then the algorithm ends 1212 the calibration period. Next, the algorithm calculates 1214 the contribution to hookload of a component linear in the travelling block velocity. The algorithm then calculates 1216 the contribution to hookload of a component linear in a direction in the travelling block velocity. Raw hookload measurements are then corrected 1218 by the calculated contributions for raw hookload measurements taken outside the calibration period.

The algorithm illustrated in FIG. 12 may be loaded into an autodriller 40, as described with reference to FIGS. 1-5, to calibrate hookload measurements during the drilling operations.

Corrected hookload measurements may be used in conjunction with algorithms for improved estimation of drilling parameters such as downhole rate of penetration ROP. During drilling procedures, properties of weight may be taken by the bit so as to reduce the hookload. Weight on bit may equate to the string weight minus the hookload. Friction and buoyancy may also factor into a determination of weight-on-bit. Thus, corrected hookload measurements may be correlated to weight-on-bit.

An autodriller may control the vertical movement of the drill string so as to keep a drilling parameter at a set value, i.e., weight, or surface rate-of-penetration (ROP), or pressure. The autodriller may use some form of a proportional-integral (PI) controller, which has two parameters in addition to the constant parameter—the proportional and the integral gains. The transient behavior of the drilling system as the set value is changed, depends both on these parameters and parameters that describe the dynamics of the drilling process. The autodriller may combine data acquired during both transients and when at set values to estimate drilling process parameters and to optimize the PI controller parameters.

A good model for describing the relationship between the motion of the top and bottom of a drill string and the weight-on-bit is $$v_{surface} - v_{bit} = \lambda \frac{dW}{dt} \quad (1)$$

Where $v_{surface}$ is the velocity of the top of the drill string, $v_{bit}$ is the velocity of the bit, W is the weight-on-bit, and $\lambda$ is the compliance of the drill string and system between the two velocity measuring points.

The bit velocity (rate-of-penetration) (ROP) will normally depend on the weight-on-bit, and in normal circumstances will increase as weight increases. For many bits, a linear dependency is appropriate $$v_{bit} = k(W - W_0) \quad (2)$$

where k is a constant, and $W_0$ is an offset which may be zero. In particular, $W_0$ may be based on corrected hookload data. Even if the dependency is not linear, then it still may be describable using equation (2) over small weight variations.

Modern auto-drillers can control precisely the rate at which the drill string moves down. They can therefore drill at a controlled surface rate-of-penetration (ROP) without any additional control architecture. In order to control another variable using surface ROP an additional control loop is required. The most common variables used for control are weight-on-bit (WOB) pressure and torque. The invention can be used for WOB control and for torque control, wherein WOB may be correlated to corrected hookload data.

If drilling is steady at surface ROP $v_1$, under ROP control, and the rock is uniform, then WOB will be roughly constant too and given by $$W_1 + W_0 + \frac{v_1}{k}$$

If the surface ROP is changed to $v_2$ then after a transitional time it will asymptote to weight $W_2$ $$W_2 + W_0 + \frac{v_2}{k}$$

Combining equations (1) and (2), and solving for weight, the transition will be exponential between the two weights. If the surface ROP is changed at time ti, then the weight will follow $$W(t) = W_2 + (W_1 + W_2)e^{(-\eta(t-t1))}$$

Where $$\eta = \frac{\lambda}{k}$$

The inverse of $\eta$ has the units of time, and is often referred to as the drill-off time, as if $v_2$ is zero, then the end-weight is zero (or at least the weight at which drilling ceases). If this exponential transition can be captured, then the rate-constant $\eta$ can be determined from the data (for instance using Prony's method). The data may be noisy, however by making small changes in opposing directions at long enough intervals, the results can be summed (with a sign appropriate to the sign of the change in surface ROP), and the rate constant determined from the summed data.

Conventional autodrillers employ proportional-integral (PI) controllers on the surface ROP (the rate of descent of the top of the drill string) in order to control weight. Thus for instance, $$v_{surface} = -a(W - W_d) - \frac{a}{\tau} \int (W - W_d) \quad (3)$$

where a and $\tau$ are constants, $W_d$ is the desired WOB and the integral denotes a sum over past times. Such a system can maintain a very constant WOB as drilling progresses. If it is determined that a different WOB is desired, then $W_d$ changes, and the system undergoes a transient response, which will usually last some seconds. In order to avoid weight changes inducing unwanted vibration in the drill string, it may be desirable to make a gradual variation in WOB from one value to another, over a predetermined period. Often it is desired for WOB to change linearly with time from one value to another, thus during the transitional period it is desirable to use a different control method that will achieve a change in WOB close to that desired, and then revert to a PI control once the change has been made. The surface velocity and bit velocity differ due to the compliance of the drill string, and the bit velocity depends on WOB, normally in a way that is approximately linear. Thus $$v_{surface} - v_{bit} = \lambda \frac{dW}{dt} \quad (4)$$

$$v_{bit} = k(W - W_0) \quad (5)$$

Where $v_{surface}$ is the velocity of the top of the drill string, $v_{bit}$ is the velocity of the bit, W is the weight-on-bit, k is a constant, $W_0$ is a weight offset, and $\lambda$ is the compliance of the drill string and system between the two velocity measuring points. Thus $$v_{surface} = k(W - W_0) + \lambda \frac{dW}{Dt} \quad (6)$$

If it is proposed that the weight follow a defined trajectory versus time, and the quantities k, $W_0$ and $\lambda$ are known (or can be estimated) then equation (6) may be used to deterministically control the motion of the top of the drill string. In particular, $W_0$ may be based on corrected hookload data. Over long periods, due to the inexact nature of the model, the actual weight will diverge from the proposed weight, however if the model is used for short periods and then feedback control (such as the PI control mechanism of equation) resumes, the actual weight will follow the desired weight sufficiently closely.

If the weight is proposed to change linearly from $W_1$ to $W_2$ over time T and the initial surface velocity is $v_1$, then for the duration of the transition, the surface velocity will be $$v_{surface}(t) = v_1\left(1 + \frac{W_2 - W_1}{W_1 - W_0}\frac{t}{T}\right) + \lambda\left(\frac{W_2 - W_1}{T}\right) \text{ for } t < T \quad (7)$$

$$v_{surface}(T) = v_1\left(\frac{W_1 - W_0}{W_1 - W_0}\right)$$

At the end of the change in weight, the Integral term in the PI control system must be updated. Before the change in weight, if the weight is close to the target weight $W_d$, equation (3) becomes $$v_{surface} = -\frac{a}{\tau} \int (W - W_d)$$

Writing $$I(t) = \int (W - W_d)$$

This implies $$I(t) \approx -\frac{\tau k}{a}(W - W_0) \text{ for } t < 0$$

If at the end of the weight change, the weight has achieved the level $W_2$, and the weight tracked the change closely, then the surface velocity will simply revert to the original value, creating a new transient.

In order to avoid this, the integral term must be close to that necessary to achieve a stable weight, thus when PI control restarts for t>T $$I(T) = \frac{W_2 - W_0}{W_1 - W_0}I(0)$$

after which PI control resumes. Even if the drilling quantities ($W_0$, k, $\lambda$) are only known approximately, once feedback control resumes, the feedback control will ensure that the weight stays close to the target weight, and so long as the errors are small, any transients on restarting feedback control will be small. If the drilling quantities have not been correctly estimated, or there is a change in drilling while the ramp is in progress (for instance, a different rock is penetrated), then the change in weight may be appreciably different to that anticipated. If the result is that the change after the ramp is less than desired, then when PI control resumes, the system will quickly move to the desired weight with little ill-effect. If the system overshoots, then it may, for instance, result in excessive weight-on-bit. Therefore, a desirable modification of the control is that the feed-forward control is aborted once the weight reaches the target weight if this is achieved before the end of the ramp time. Thus, more accurate weight-on-bit estimates correlated to corrected hookload measurements may ensure only small errors for the drilling quantity ($W_0$).

Although the disclosed embodiments are described in detail in the present disclosure, it should be understood that various changes, substitutions and alterations can be made to the embodiments without departing from their spirit and scope.

What is claimed is:

1. A method for monitoring hookload in a well drilling system, the method comprising:
    measuring raw hookload;
    determining a velocity of a travelling block;
    holding the travelling block in a non-lowering state for a first period of time;
    lowering the travelling block for a second period of time;
    calculating contribution to hookload of a component linear in the block velocity;
    calculating contribution to hookload of a component linear in a direction (sign) in the block velocity; and
    correcting measured raw hookload by the calculated contributions.

2. A method for monitoring hookload in a well drilling system as claimed in claim 1, wherein the first period of time is between about 1 second and about 120 seconds in length, and wherein the second period of time is between about 1 second and about 20 seconds in length.

3. A method for monitoring hookload in a well drilling system as claimed in claim 1, wherein the calculating contribution to hookload of a component linear in the block velocity and the calculating contribution to hookload of a component linear in a direction in the block velocity comprise using linear regression.

4. A method for monitoring hookload in a well drilling system as claimed in claim 1, wherein the correcting measured raw hookload by the calculated contributions comprises subtracting the calculated contributions from the measured raw hookload.

5. A method for monitoring hookload in a well drilling system as claimed in claim 1, further comprises preventing the weigh-on-bit from exceeding a preset limit during said lowering the travelling block for a second period of time.

6. A method for monitoring hookload in a well drilling system as claimed in claim 1, further comprises preventing the weigh-on-bit from decreasing below a preset limit during said holding the travelling block in a steady position for a first period of time.

7. A method for monitoring hookload in a well drilling system as claimed in claim 1, further comprising repeating the steps of holding the travelling block and lowering the travelling block during a calibration period.

8. A method for monitoring hookload in a well drilling system as claimed in claim 7, wherein the first and second periods of time are different when the steps of holding the travelling block and lowering the travelling block are repeated.

9. A method for monitoring hookload in a well drilling system as claimed in claim 7, wherein the repeated first and second periods of time each comprise a mixture of full amplitude fast and slow block movements, together with some shorter movements, whereby a variety of travelling block velocity profiles are used when the steps of holding the travelling block and lowering the travelling block are repeated.

10. A method for monitoring hookload in a well drilling system as claimed in claim 7, wherein the calibration period is between about 5 minutes and about 45 minutes in length.

11. An autodriller for monitoring hookload in a well drilling system, the autodriller comprising:
    a hookload receptor that receives a signal corresponding to raw hookload;
    a travelling block receptor that receives a signal corresponding to travelling block velocity;
    a processor;
    a non-transitory storage medium; and
    a set of computer readable instructions stored in the non-transitory storage medium, wherein when the instructions are executed by the processor allow the autodriller to:
        command the travelling block to hold not lower for a first period of time;
        command the travelling block to lower for a second period of time;
        calculate contribution to hookload of a component linear in the block velocity;
        calculate contribution to hookload of a component linear in a direction in the block velocity; and
        correct measured raw hookload by the calculated contributions.

12. An autodriller for monitoring hookload in a well drilling system, as claimed in claim 11, wherein the first period of time is between about 1 second and about 120 seconds in length, and wherein the second period of time is between about 1 second and about 20 seconds in length.

13. An autodriller for monitoring hookload in a well drilling system, as claimed in claim 11, wherein the calculating contribution to hookload of a component linear in the block velocity and the calculating contribution to hookload of a component linear in a direction (sign) in the block velocity comprise using linear regression.

14. An autodriller for monitoring hookload in a well drilling system, as claimed in claim 11, wherein the correcting measured raw hookload by the calculated contributions comprises subtracting the calculated contributions from the measured raw hookload.

15. An autodriller for monitoring hookload in a well drilling system, as claimed in claim 11, wherein when the instructions are executed by the processor the instructions further allow the autodriller to prevent the weigh-on-bit from exceeding a preset limit while the travelling block is commanded to lower for the second period of time.

16. An autodriller for monitoring hookload in a well drilling system, as claimed in claim 11, wherein when the instructions are executed by the processor the instructions further allow the autodriller to prevent the weigh-on-bit from decreasing below a preset limit while the travelling block is commanded to hold a steady position for the first period of time.

17. An autodriller for monitoring hookload in a well drilling system, as claimed in claim 11, wherein when the instructions are executed by the processor the instructions further allow the autodriller to repeatedly command the travelling block to hold in a steady position and repeatedly command the travelling block to lower during a calibration period.

18. An autodriller for monitoring hookload in a well drilling system, as claimed in claim 17, wherein the first and second periods of time are different when the command of the travelling block to hold in a steady position for a first period of time is repeated and the command of the travelling block to lower for a second period of time is repeated.

19. An autodriller for monitoring hookload in a well drilling system, as claimed in claim 17, wherein the repeated first and second periods of time each comprise a mixture of full amplitude fast and slow block movements, together with some shorter movements, whereby a variety of travelling block velocity profiles are used when the steps of holding the travelling block and lowering the travelling block are repeated.

20. An autodriller for monitoring hookload in a well drilling system, as claimed in claim 17, wherein the calibration period is between about 5 minutes and about 45 minutes in length.

* * * * *